United States Patent
Masuko et al.

(10) Patent No.: US 10,853,643 B2
(45) Date of Patent: Dec. 1, 2020

(54) IMAGE EXTRACTION DEVICE, IMAGE EXTRACTION METHOD, AND IMAGE EXTRACTION PROGRAM

(71) Applicant: Rakuten, Inc., Tokyo (JP)

(72) Inventors: Soh Masuko, Tokyo (JP); Naho Kono, Tokyo (JP); Ryosuke Kuroki, Tokyo (JP)

(73) Assignee: Rakuten, Inc., Tokyo (JP)

( * ) Notice: Subject to any disclaimer, the term of this patent is extended or adjusted under 35 U.S.C. 154(b) by 98 days.

(21) Appl. No.: 16/305,584

(22) PCT Filed: Oct. 27, 2017

(86) PCT No.: PCT/JP2017/038921
§ 371 (c)(1),
(2) Date: Nov. 29, 2018

(87) PCT Pub. No.: WO2019/082381
PCT Pub. Date: May 2, 2019

(65) Prior Publication Data
US 2019/0213410 A1   Jul. 11, 2019

(51) Int. Cl.
*G06K 9/00* (2006.01)
*G06F 16/53* (2019.01)
(Continued)

(52) U.S. Cl.
CPC ......... *G06K 9/00624* (2013.01); *G06F 16/53* (2019.01); *G06K 9/46* (2013.01); *G06K 9/6215* (2013.01); *G06K 9/6217* (2013.01)

(58) Field of Classification Search
CPC ............. G06K 9/00624; G06K 9/6217; G06K 9/6215; G06K 9/46; G06K 9/00664; G06K 2209/01; G06K 9/3258; G06F 16/53
See application file for complete search history.

(56) References Cited

U.S. PATENT DOCUMENTS

2008/0131001 A1* 6/2008 Hofman ............... G06K 9/3283
                                                   382/182
2013/0261969 A1   10/2013 Nakamura et al.
(Continued)

FOREIGN PATENT DOCUMENTS

JP       4881493 B1    2/2012
JP    2016-115067 A    6/2016
(Continued)

OTHER PUBLICATIONS

International Search Report for PCT/JP2017/038921 dated Jan. 23, 2018 [PCT/ISA/210].

*Primary Examiner* — Neil R McLean
(74) *Attorney, Agent, or Firm* — Sughrue Mion, PLLC

(57) ABSTRACT

Increasing the probability that an image showing the front face of a display object is displayed initially is enabled.
An image extraction device acquires position information indicating a position of a display object and display object information indicating the display object. The image extraction device extracts a partial image including the acquired display object information from images photographed from at least one spot located within a predetermined distance of a position indicated by the acquired position information. The image extraction device outputs the extracted partial image.

11 Claims, 13 Drawing Sheets

(51) Int. Cl.
G06K 9/46 (2006.01)
G06K 9/62 (2006.01)

(56) References Cited

U.S. PATENT DOCUMENTS

2013/0297648 A1* 11/2013 Hotta .................... G06F 16/532
707/769
2014/0278603 A1* 9/2014 Lievens ............. G06Q 30/0207
705/5
2018/0114330 A1* 4/2018 Wexler ................. G01S 5/0027
2018/0130225 A1* 5/2018 Hatanaka ............. G06K 9/6202

FOREIGN PATENT DOCUMENTS

WO 2013/114473 A1 8/2013
WO 2016/125307 A1 8/2016

* cited by examiner

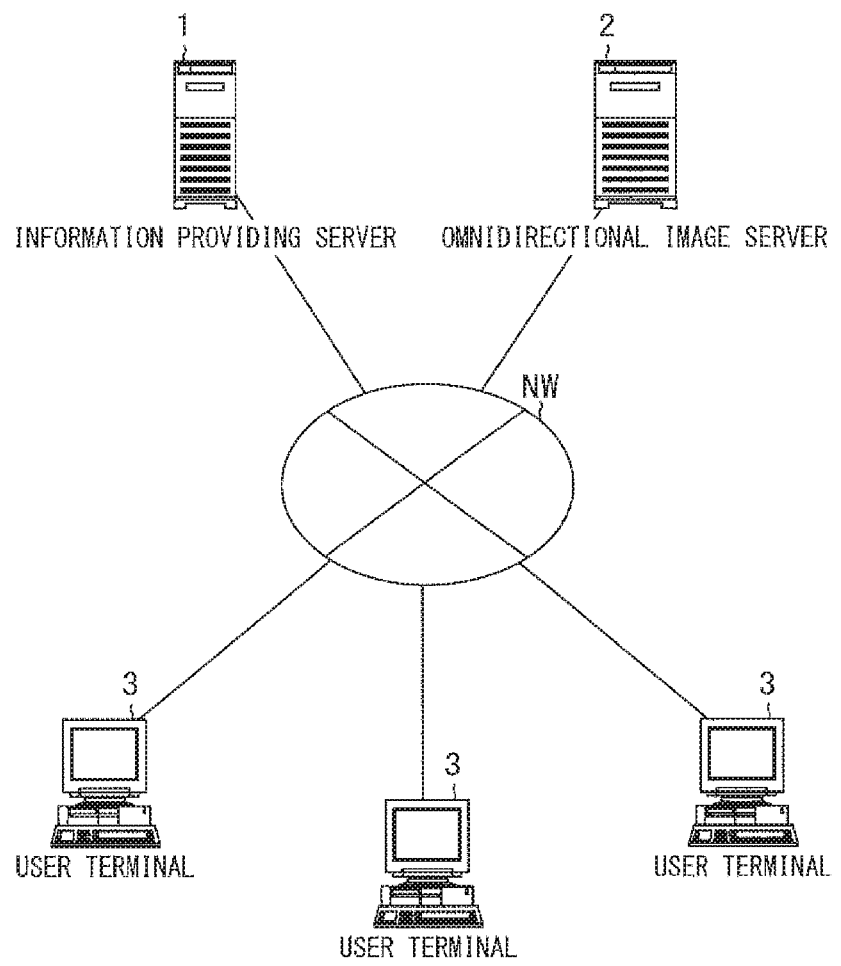

FIG.3

SHOP DB 14a

| SHOP ID |
|---|
| SHOP NAME |
| ADDRESS |
| ... |

SALE ITEM DB 14b

| SALE ITEM ID |
|---|
| SHOP ID |
| SALE ITEM NAME |
| PRICE |
| SALE ITEM IMAGE |
| EXPLANATION |
| ... |

ORIGINAL OMNIDIRECTIONAL IMAGE
LOW-RESOLUTION OMNIDIRECTIONAL IMAGE

OMNIDIRECTIONAL IMAGE DB 24a

| LATITUDE AND LONGITUDE | PHOTOGRAPHING DATE AND TIME | OMNIDIRECTIONAL IMAGE 1 |
|---|---|---|
|  | PHOTOGRAPHING DATE AND TIME | OMNIDIRECTIONAL IMAGE 2 |
|  | ... | ... |

FIG.10

GEOGRAPHICAL OBJECT DB  14c
| GEOGRAPHICAL OBJECT ID |
| GEOGRAPHICAL OBJECT NAME |
| POSITION INFORMATION |
| CATEGORY INFORMATION |
| . . . |

IMAGE FEATURE VALUE DB  14d
| KEYWORD |
| FEATURE VALUES |

FIG.11
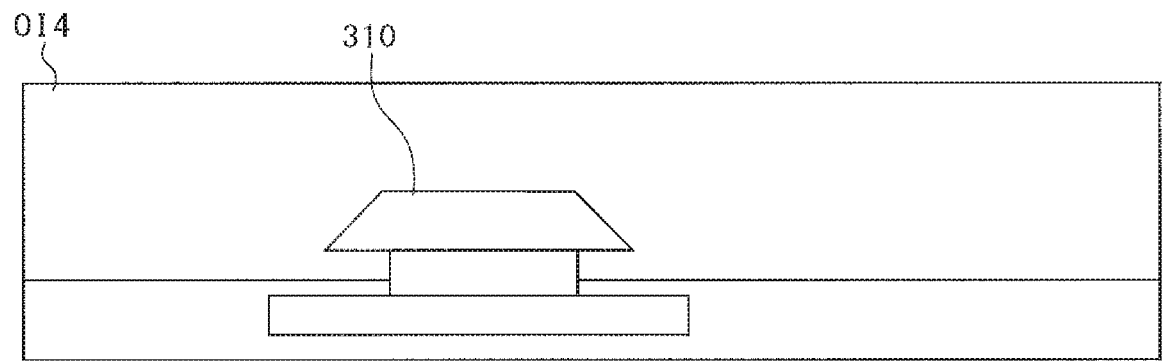
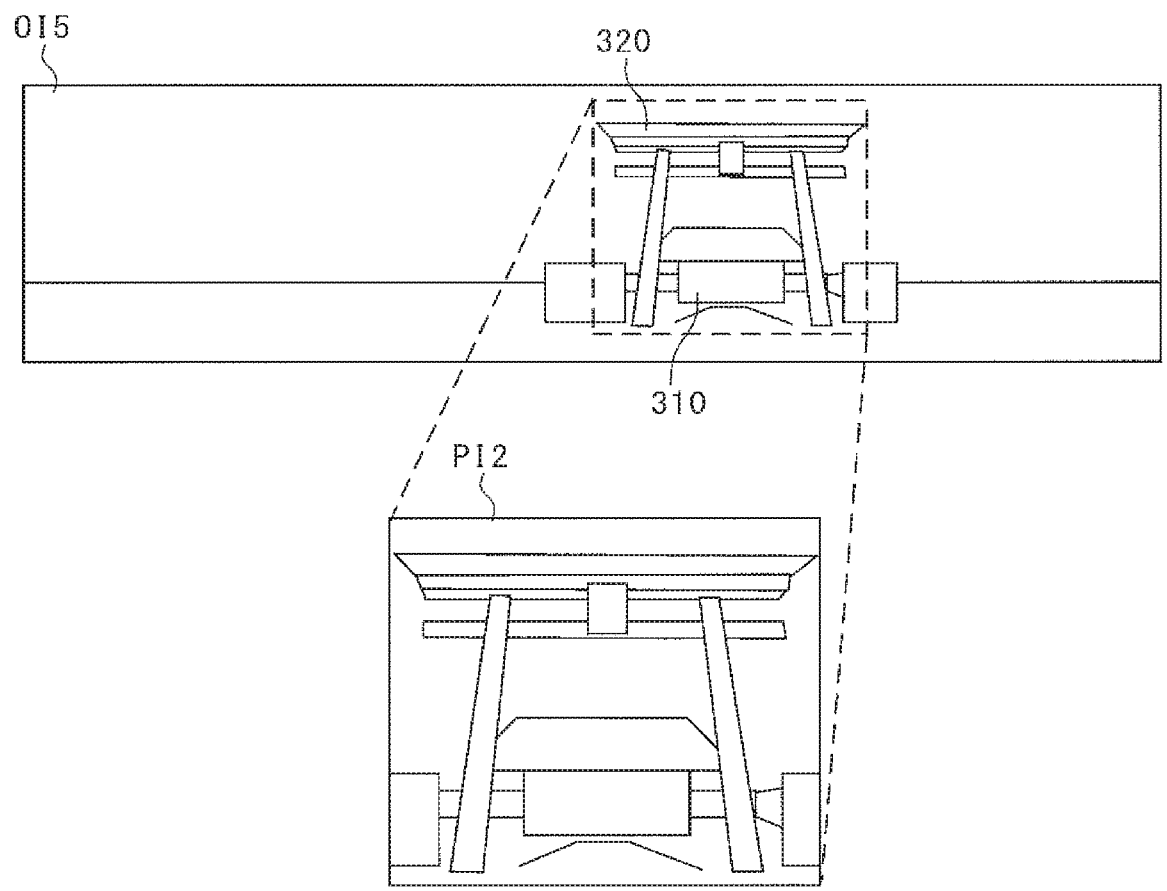

IMAGE EXTRACTION DEVICE, IMAGE EXTRACTION METHOD, AND IMAGE EXTRACTION PROGRAM

CROSS REFERENCE TO RELATED APPLICATIONS

This application is a National Stage of International Application No. PCT/JP2017/038921 filed Oct. 27, 2017, the disclosure of which is incorporated herein in its entirety by reference.

TECHNICAL FIELD

The present invention relates to a technical field of an image extraction device, an image extraction method, and an image extraction program that extract, from images photographed at a spot around a place where a display object is positioned, an image showing the display object.

BACKGROUND ART

Conventionally, there has been known systems that identify a position of a display object on the basis of a request of search for the display object from a user and displays an image that is an image photographed at a spot around the position and shows the display object. For example, Patent Literature 1 discloses a system that when spot information of a display object is set, identifies a viewpoint nearest from a spot of the display object, identifies a direction of the spot of the display object from the viewpoint, extracts an image in the identified direction from an omnidirectional image corresponding to the identified viewpoint, and transmits the extracted image to an image display terminal.

CITATION LIST

Patent Literature

Patent Literature 1: JP 2016-115067 A

SUMMARY OF INVENTION

Technical Problem

With a technology disclosed in Patent Literature 1, there may be a case where an image showing a display object can be displayed. However, in a case where a viewpoint nearest from a spot of the display object is positioned at the back side or the right or left side of the display object, an image showing a front face of the display object cannot be displayed. In this case, a user needs to perform an operation of changing a viewpoint to the front side of the display object in order to display the image showing the front face of the display object.

The present invention has been made in view of the above points and aims at providing an image extraction device, an image extraction method, and an image extraction program capable of increasing a probability that an image showing the front face of the display object is displayed initially.

Solution to Problem

In order to solve the above problem, the invention according to claim 1 is an image extraction device, comprising: an acquisition means that acquires position information indicating a position of a display object and display object information indicating the display object; an extraction means that extracts at least one partial image including the acquired display object information from an image photographed from at least one spot located within a predetermined distance of a position indicated by the acquired position information; and an output means that outputs the extracted partial images.

According to the invention, the image extraction device extracts a partial image including display object information from images photographed from one or more spots located within a predetermined distance of a position of a geographical object and outputs the partial image. Hence, it is possible to increase the probability that an image showing the front face of the display object is displayed initially as the partial image.

The invention according to claim 2 is the image extraction device according to claim 1, wherein the acquisition means acquires the display object information that indicates an appearance of at least part of a front face of the display object, and the extraction means extracts a partial image including an image that has the appearance indicated by the display object information.

According to the invention, the probability that an image showing the front face of the display object is displayed initially can be increased.

The invention according to claim 3 is the image extraction device according to claim 1 or 2, wherein the acquisition means acquires the display object information that indicates a name of the display object, and the extraction means extracts a partial image that includes the name of the display object in the image.

According to the invention, an information processing device extracts a partial image that includes, in the image, a name of a display object that is probably being displayed at a front face of the display object. Hence, the probability that an image showing the front face of the display object is displayed initially can be increased.

The invention according to claim 4 is the image extraction device according to claim 3, wherein the display object information includes the name of the display object, and the acquisition means acquires position information associated with the name included in the display object information from an position information storage means that stores, for each of a plurality of geographical objects, a name of a geographical objects and position information indicating a position of the geographical object in association with each other.

According to the invention, the information processing device can extract a partial image and acquire position information of the display object by using a name of the display object.

The invention according to claim 5 is the image extraction device according to any one of claims 1 to 4, wherein the acquisition means acquires, as the display object information, feature information of a geographical object in a category corresponding to the display object from a feature information storage means that stores feature information indicating a feature of an image of each of geographical objects in a plurality of categories, and the extraction means extracts a partial image including a feature indicated by the acquired feature information.

According to the invention, the information processing device extracts a partial image including a feature indicated by feature information of a geographical object in a category corresponding to the display object. Hence, the probability that an image showing the front face of the display object is displayed initially can be increased.

The invention according to claim 6 is the image extraction device according to any one of claims 1 to 5, wherein the extraction means includes: a low-resolution image acquisition unit that acquires a plurality of low resolution images from an image storage means that stores, as the image photographed from at least one spot, the plurality of low resolution images each having a relatively low resolution and a plurality of high resolution images each having a relatively high resolution, the plurality of high resolution images corresponding to the plurality of respective low resolution images; a specification unit that identifies a low resolution image including the display object information among the acquired plurality of low resolution images; a high-resolution image acquisition unit that acquires, from the image storage means, a high resolution image corresponding to the identified low resolution image among the plurality of high resolution images; and an extraction unit that extracts the partial image including the display object information from the acquired high resolution image.

According to the invention, the information processing device initially identifies a low resolution image including display object information among a plurality of low resolution images. Next, the information processing device extracts a partial image from a high resolution image corresponding to the identified low resolution image among a plurality of high resolution images respectively corresponding to the plurality of low resolution images. The information processing device may extract, from an image storage means, only a high resolution image corresponding to the identified low resolution image among the plurality of high resolution images. Hence, it is possible to reduce a processing load on the information processing device and a communication load between the information processing device and the image storage means as compared with a case of acquiring all high resolution images.

The invention according to claim 7 is the image extraction device according to any one of claims 1 to 6, wherein the extraction means extracts the partial image from the photographed images by using pattern recognition.

The invention according to claim 8 is an image extraction method performed by a computer, the method comprising: acquiring position information indicating a position of a display object and display object information indicating the display object; extracting at least one partial image including the acquired display object information from an image photographed from at least one spot located within a predetermined distance of a position indicated by the acquired position information; and outputting the extracted partial images.

The invention according to claim 9 is an image extraction program for causing a computer to function as: an acquisition means that acquires position information indicating a position of a display object and display object information indicating the display object; an extraction means that extracts at least one partial image including the acquired display object information from an image photographed from at least one spot located within a predetermined distance of a position indicated by the acquired position information; and an output means that outputs the extracted partial images.

Advantageous Effects of Invention

According to the invention, the image extraction device extracts a partial image including display object information from images photographed from one or more spots located within a predetermined distance of a position of a geographical object and outputs the partial image. Hence, it is possible to increase the probability that an image showing the front face of the display object is displayed initially as the partial image.

BRIEF DESCRIPTION OF DRAWINGS

FIG. 1 is a diagram that illustrates one example of a schematic configuration of an information providing system S according to one embodiment.

FIG. 3 is a diagram that illustrates one example of contents stored in databases.

FIG. 10 is a diagram that illustrates one example of contents stored in databases.

FIG. 11 is a diagram that illustrates examples of an omnidirectional image and a partial image.

DESCRIPTION OF EMBODIMENTS

Figure 2A:
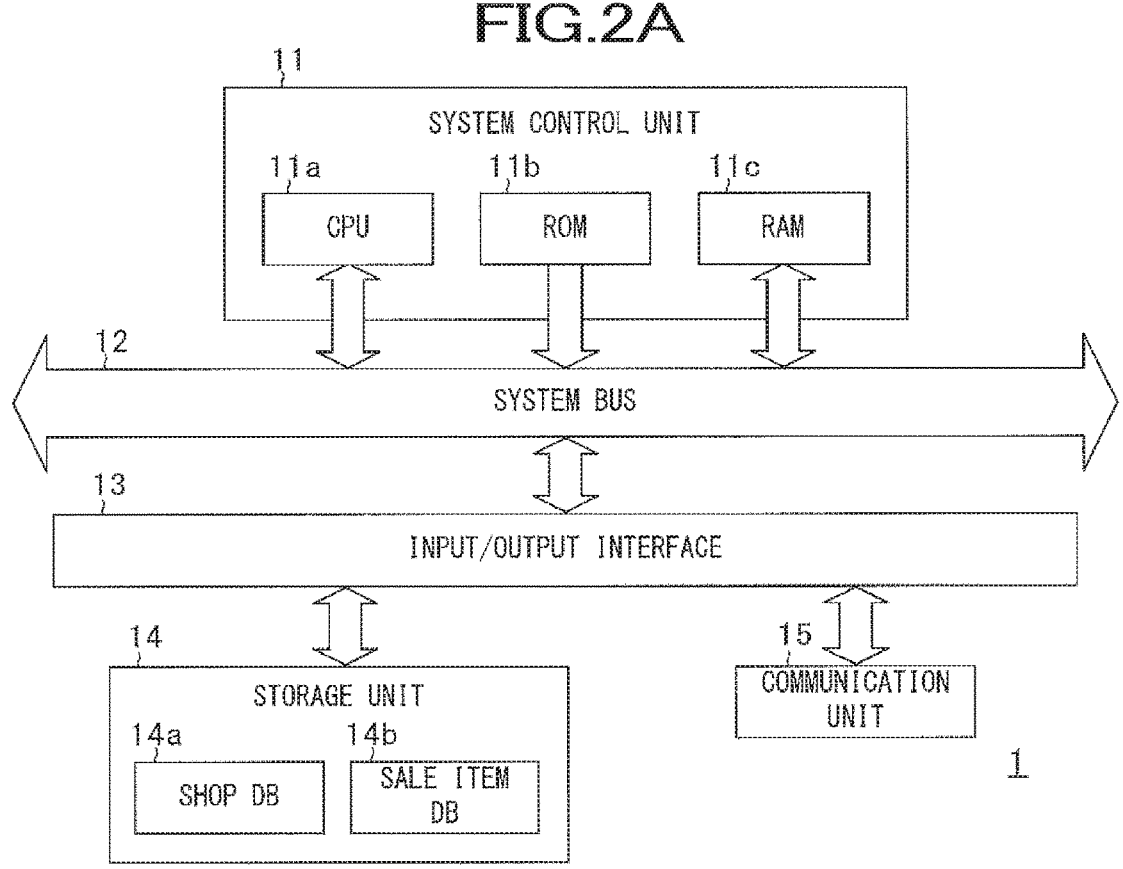
FIG. 2A is a block diagram that illustrates one example of a schematic configuration of an information providing server 1 according to one embodiment.

Embodiments of the present invention will be described below in detail with reference to drawings. Note that, the embodiments described below are embodiments in a case where the present invention is applied to an information providing server that provides information including a partial image of a display object. The display object is a geographical object whose image is displayed among a plurality of geographical objects. The geographical object is, for example, an object identified by use of geographical information, such as a map. The geographical object is an object existing, for example, on a ground or in an underground space. The geographical object may be an artificial object or a natural object. The position (longitude and latitude) of the geographical object basically does not change or does not change for a certain period of time. Each geographical object desirably has a specific name indicating the geographical object but may not necessarily have a specific name. Examples of the geographical object include a building, a house, a tower, a park, other constructs, a memorial, a statue, a timber, a mountain, a rock, and the like. In addition, the geographical object may be, for example, a part of a construct, such as one floor, one room, or one partition. In addition, the geographical object that can be a display object may comprise a plurality of objects. For example, the park comprises a plurality of playing tools, fences, and the like arranged in premises. In the embodiments described below, a partial image is extracted from an omnidirectional image. The omnidirectional image is photographed, for example, by use of an omnidirectional camera. However, a partial image may be extracted, for example, from a panorama image, an image photographed at a general angle of view, or the like. In addition, the present invention can be applied to various systems that provide images of geographical objects.

1. First Embodiment

[1-1. Configuration of Information Providing System]

First, a configuration of an information providing system S according to the present embodiment will be described with reference to FIG. 1. FIG. 1 is a diagram that illustrates one example of a schematic configuration of the information providing system S according to the present embodiment.

As shown in FIG. 1, the information providing system S includes an information providing server 1, an omnidirectional image server 2, and a plurality of user terminals 3. The information providing server 1 is one example of an information processing device of the present invention.

The information providing server 1, the omnidirectional image server 2, and the user terminals 3 can mutually transmit and receive data using, for example, a communication protocol, such as TCP/IP, via a network NW. Note that, the network NW is built by, for example, the Internet, a dedicated communication line (for example, Community Antenna Television (CATV) line), a mobile communication network (including a base station and the like), a gateway, and the like.

In the present embodiment, the information providing server 1 is a server device that executes various processing for a certain online shopping mall. Items for sale are sold in a plurality of shops in the online shopping mall. The shop is one example of a geographical object. The information providing server 1 searches for items for sale in response to requests from the user terminals 3. The information providing server 1 transmits a web page showing a search result of the items for sale as a search result page to the user terminals 3. When a user selected any item for sale from the search result page, the information providing server 1 transmits a web page showing detail information about the item for sale as a sale item page to the user terminal 3. An image is displayed which shows a front face of a shop of a selling source of the item for sale found or selected in the search result page or sale item page. The information providing server 1 acquires an omnidirectional image from the omnidirectional image server 2 and extracts a partial image showing the shop from the omnidirectional image.

The omnidirectional image server 2 stores omnidirectional images photographed from various spots (viewpoints). The omnidirectional image server 2 provides an omnidirectional image to the information providing server 1 in response to a request from the information providing server 1. Specifically, the omnidirectional image server 2, upon receiving position information from the information providing server 1, transmits, to the information providing server 1, one or more omnidirectional images that have been photographed at one or more viewpoints located within a predetermined distance of a position indicated by the position information. Examples of the position information include a longitude and latitude, an address, and the like. Note that, the information providing server 1 and the omnidirectional image server 2 may be integrally configured.

The user terminal 3 is a communication device used by a user who uses the information providing system S. The user terminal 3 accesses the information providing server 1 through a network NW and displays a web page. The user terminal 3 has a program, such as a browser, installed therein. Examples of the user terminal 3 include a personal computer, a portable information terminal, such as Personal Digital Assistant (PDA), a smartphone, or a tablet computer, a mobile phone, and the like.

[1-2. Configuration of Information Providing Server]

Next, a configuration of the information providing server 1 will be described with reference to FIGS. 2A and 3. FIG. 2A is a block diagram that illustrates one example of a schematic configuration of the information providing server 1 according to the present embodiment. As shown in FIG. 2A, the information providing server 1 includes a system control unit 11, a system bus 12, an input/output interface 13, a storage unit 14, and a communication unit 15. The system control unit 11 and the input/output interface 13 are connected via the system bus 12.

The system control unit 11 is configured with a Central Processing Unit (CPU) 11a, a Read Only Memory (ROM) 11b, a Random Access Memory (RAM) 11c, and the like. The CPU 11a is one example of a processor. Note that, the present invention is also applicable to various processors different from a CPU. Each of the storage unit 14, the ROM 11b, and the RAM 11c is one example of a memory. Note that, the present invention is also applicable to various memories different from a hard disc, a ROM, and a RAM.

The input/output interface 13 performs interface processing between the storage unit 14 and the communication unit 15 and the system control unit 11.

The storage unit 14 is, for example, configured with a hard disc drive and the like. The storage unit 14 stores databases, such as a shop DB 14a and a sale item DB 14b. "DB" is an abbreviation of database.

FIG. 3 is a diagram that illustrates one example of contents stored in databases. The shop DB 14a stores shop information about shops. Specifically, the shop DB 14a stores shop attributes, such as a shop ID, a shop name, and a shop address, in association with each other for each shop. The shop ID is identification information to identify a shop.

The sale item DB 14b stores sale item information about items for sale that are sold in the online shopping mall. Specifically, the sale item DB 14b stores a sale item ID, a shop ID, a sale item name, a price, a sale item image, sale item explanation, and the like in association with each other for each item for sale. The sale item ID is identification information to identify an item for sale. The shop ID indicates a selling source of an item for sale.

The storage unit 14 stores various kinds of data for further displaying web pages, such as HyperText Markup Language (HTML) documents, Extensible Markup Language (XML) documents, image data, text data, and electronic documents. Further, the storage unit 14 stores various kinds of set values.

In addition, the storage unit 14 stores various kinds of programs, such as Operating System, Database Management System (DBMS), and an information providing server program. The information providing server program is a program for causing the system control unit 11 to execute various kinds of processing regarding provision of information to the user terminals 3. The information providing server program includes various kinds of program codes, such as an acquisition code, an extraction code, and an output code. Note that, various kinds of programs may be acquired, for example, from another server device and the like through the network NW, or may be recorded on a recording medium, such as a magnetic tape, an optical disc, or a memory card, and read via a drive device. In addition, the information providing server program and the like may be a program product.

The communication unit 15 connects to the user terminals 3 or the omnidirectional image server 2 through the network NW and controls communication states with these devices.

[1-3. Configuration of Omnidirectional Image Server]

Figure 2B:
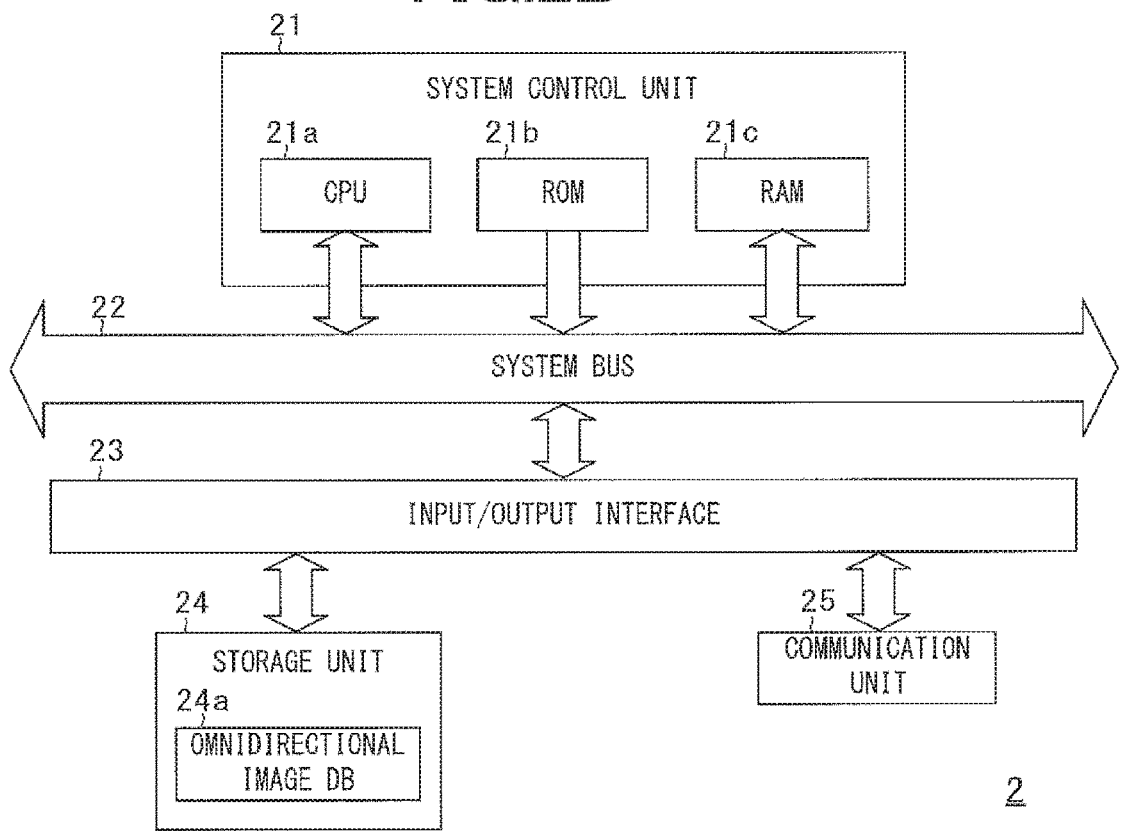
FIG. 2B is a block diagram that illustrates one example of a schematic configuration of an omnidirectional image server 2 according to one embodiment.

Next, a configuration of the omnidirectional image server 2 will be described with reference to FIGS. 2B and 3. FIG. 2B is a block diagram that illustrates one example of a schematic configuration of the omnidirectional image server 2 according to the present embodiment. As shown in FIG. 2B, the omnidirectional image server 2 includes a system control unit 21, a system bus 22, an input/output interface 23, a storage unit 24, and a communication unit 25. The system control unit 21 and the input/output interface 23 are connected via the system bus 22.

The system control unit 21 is configured with a CPU 21a, a ROM 21b, a RAM 21c, and the like.

The input/output interface 23 performs interface processing between the storage unit 24 and the communication unit 25 and the system control unit 21.

The storage unit 24 is, for example, configured with a hard disc drive and the like. The storage unit 24 stores databases, such as an omnidirectional image DB 24a and the like.

As shown in FIG. 3, the omnidirectional image DB 24a stores omnidirectional images. Specifically, the omnidirectional image DB 24a stores, in association with a longitude and latitude of each viewpoint, an omnidirectional image photographed from a position indicated by the longitude and latitude and a photographing date and time of the omnidirectional image. The viewpoint basically exists outdoors. However, an omnidirectional image photographed indoors, such as in a department store or a shopping mall, may be stored in the omnidirectional image DB 24a. For one viewpoint (one set of a longitude and a latitude), at least one omnidirectional image photographed at one date and time may be stored, or a plurality of omnidirectional images photographed at a plurality of dates and times different from each other may be stored. For each photographed omnidirectional image, one or more omnidirectional images each having a lower resolution than the resolution of the omnidirectional image may be further stored in the omnidirectional image DB 24a. For example, the photographed omnidirectional image itself is stored as an original omnidirectional image in the omnidirectional image DB 24a. The system control unit 21 generates an omnidirectional image having a lower resolution than the resolution of the original omnidirectional image as a low-resolution omnidirectional image by transforming the original omnidirectional image. The system control unit 21 stores the low-resolution omnidirectional image in the omnidirectional image DB 24a. The resolutions of all the original omnidirectional images may be the same or different from each other. The resolutions of all the low-resolution omnidirectional images may be the same or different from each other. The resolution of each low-resolution omnidirectional image just needs to be lower than the resolution of the original omnidirectional image of the generation source. In addition, for one original omnidirectional image, a plurality of low-resolution omnidirectional images having resolutions different from each other may be stored in the omnidirectional image DB 24a.

The communication unit 25 connects to the information providing server 1 through the network NW and controls a communication state with the information providing server 1.

[1-4. Function Summary of System Control Unit of Information Providing Server]

Figure 4:
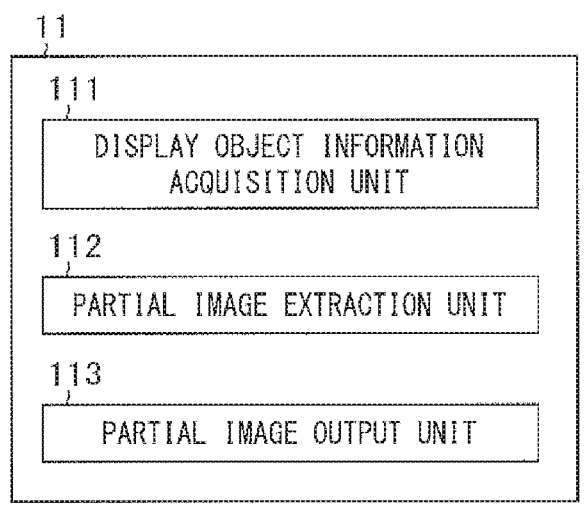
FIG. 4 is a diagram that illustrates one example of function blocks of a system control unit 11 of the information providing server 1 according to one embodiment.

Next, a function summary of the system control unit 11 of the information providing server 1 will be described with reference to FIGS. 4 to 7. FIG. 4 is a diagram that illustrates one example of function blocks of the system control unit 11 of the information providing server 1 according to the present embodiment. The system control unit 11 functions, as shown in FIG. 4, as a display object information acquisition unit 111, a partial image extraction unit 112, a partial image output unit 113, and the like by the CPU 11a reading and executing the acquisition codes, extraction codes, output codes, and the like which are included in the information providing server program. The display object information acquisition unit 111 is one example of the acquisition means of the present invention. The partial image extraction unit 112 is one example of the extraction means of the present invention. The partial image output unit 113 is one example of the output means of the present invention.

The display object information acquisition unit 111 acquires position information indicating a position of a display object and display object information indicating the display object. The position information specifically indicates a geographical position of the display object. As described above, the position information is, for example, a longitude and latitude, an address, or the like. The display object information may be, for example, information indicating an appearance (shape, pattern, color, and the like) of a whole or part of the display object. More preferably, the display object information is information indicating an appearance of at least part of a front face of the display object. Examples of the display object information include a name of the display object and feature information indicating a feature of the image of the display object. The name of a geographical object has a high probability of being displayed at the front face of the geographical object. In this point, the name of the geographical object indicates an appearance of characters representing the name that is apart of the front face of the display object. For example, the name of the geographical object is displayed on a signboard, a nameplate, a gate, and the like of the geographical object. The name of the display object is preferably a proper name. The feature information preferably indicates a feature of the shape, pattern, and color which have the probability of being positioned or displayed at the front face of the display object. Hence, the feature information indicates an appearance of at least part of a front face of the display object. The feature information may be, for example, feature values (feature vectors).

In the present embodiment, the display object is, for example, a shop designated by a user or a shop of the selling source of an item for sale designated by a user. When a user selected any shop from the search result page, the display object information acquisition unit 111 acquires a shop ID of the selected shop. Alternatively, when a user selected any item for sale from the search result page, the display object information acquisition unit 111 acquires a shop ID stored in the sale item DB 14b in association with a sale item ID of the selected item for sale. The display object information acquisition unit 111 searches for shop information associated with the shop ID from the shop DB 14a. The display object information acquisition unit 111 acquires a shop name from the shop information as the display object information.

Further, the display object information acquisition unit 111 acquires an address from the shop information and acquires a longitude and latitude corresponding to this address as the position information.

The display object information acquisition unit 111 may acquire, as the display object information, feature values of an image of the item for sale instead of the shop name or together with the shop name. The item for sale has the probability of being placed to be visible from the front face of the shop. For example, the storage unit 14 stores feature values of an exemplary image of an item for sale belonging to a category in association with each category of a plurality of items for sale. The display object information acquisition unit 111 acquires feature values corresponding to a category of an item for sale that the selected shop sells or a category of the selected item for sale. Alternatively, the display object information acquisition unit 111 may acquire an image of the item for sale from the sale item information stored in the sale item DB 14b in association with the sale item ID of the selected item for sale and extract the feature values from the image. For example, the feature values are extracted by use of an algorithm, such as SIFT (Scale Invariant Feature Transform) or SURF (Speeded Up Robust Features).

The partial image extraction unit 112 extracts a partial image including the display object information acquired by the display object information acquisition unit 111 from omnidirectional images photographed at one or more viewpoints located within a predetermined distance of a position indicated by the position information acquired by the display object information acquisition unit 111. For example, the partial image extraction unit 112 extracts a partial image including an image having an appearance indicated by the display object information. More preferably, the partial image extraction unit 112 extracts a partial image including an image having an appearance of at least part of the front face of the display object. The partial image extraction unit 112 extracts a partial image by using pattern recognition. Examples of the pattern recognition include object recognition and character recognition.

In the present embodiment, the partial image extraction unit 112 transmits the longitude and latitude acquired as the position information to the omnidirectional image server 2. The omnidirectional image server 2 searches, from the omnidirectional image DB 24a, for a longitude and latitude of a viewpoint located within a predetermined distance of a position indicated by the longitude and latitude received from the information providing server 1. The omnidirectional image server 2 may search for only a longitude and latitude of a viewpoint nearest from the position indicated by the received longitude and latitude. Alternatively, the omnidirectional image server 2 may search for longitudes and latitudes of a predetermined number of viewpoints in order of proximity from the position indicated by the received longitude and latitude. Alternatively, the omnidirectional image server 2 may search for longitudes and latitudes of all viewpoints located within a predetermined distance of a position indicated by the received longitude and latitude. The omnidirectional image server 2 acquires, for each found longitude and latitude, at least one omnidirectional image stored in the omnidirectional image DB 24a in association with the longitude and latitude. The omnidirectional image server 2 transmits the acquired omnidirectional image to the information providing server 1. Note that, the partial image extraction unit 112 may transmit an address of the shop as the display object to the omnidirectional image server 2, and the omnidirectional image server 2 may acquire a longitude and latitude of the shop from the address and search the omnidirectional image DB 24a.

The partial image extraction unit 112 uses a character recognition technique to recognize characters shown in the omnidirectional image from the omnidirectional image received from the omnidirectional image server 2. The partial image extraction unit 112 compares the recognized characters with the shop name acquired as the display object information. The partial image extraction unit 112, in a case where the recognized characters are identical with the shop name or the recognized characters include the shop name, determines that the corresponding omnidirectional image shows the shop as the display object. The partial image extraction unit 112, also in a case where a predetermined ratio or more of characters of the shop name are identical with the recognized characters, may determine that the omnidirectional image shows the shop.

The partial image extraction unit 112 extracts a partial image showing a shop from the omnidirectional image determined to show the shop. The partial image extraction unit 112 preferably identifies an area of a partial image within the omnidirectional image so that at least the shop name is included. The partial image extraction unit 112 preferably recognizes, by object recognition, a construct (namely, shop) shown in the omnidirectional image while being overlaid by the shop name and identifies an area of a partial image so that all or most of the shop is included. In a case where the address of the shop includes a floor number, the partial image extraction unit 112 preferably identifies an area of a partial image so that a floor, of the constructs shown in the omnidirectional image, that the floor number indicates is included while being overlaid by the shop name. The partial image extraction unit 112 determines, as the area of a partial image, a direction, an elevation angle, and horizontal and vertical angles of view of the construct, for example, based on the viewpoint. The partial image extraction unit 112 extracts the partial image from the omnidirectional image according to the determined area.

Figure 5:
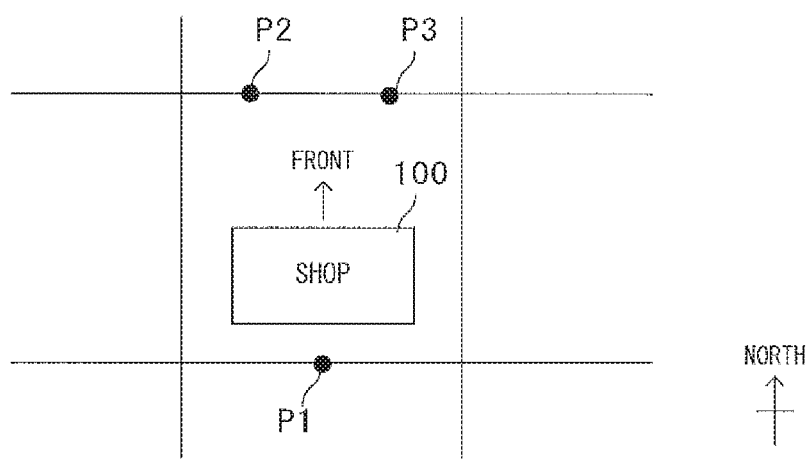
FIG. 5 is a diagram that illustrates one example of a positional relationship between a certain shop and viewpoints.

FIG. 5 is a diagram that illustrates one example of a positional relationship between a certain shop and viewpoints. As shown in FIG. 5, viewpoints P1 to P3 exist around a shop 100. The front of the shop 100 faces north. The name of the shop 100 is "XYZ SHOP". The viewpoint P1 is located south of the shop 100. The viewpoint P1 is nearest from the shop 100 among viewpoints P1 to P3. The viewpoint P2 is located north-northwest of the shop 100. The viewpoint P3 is located north-northeast of the shop 100.

Figure 6:
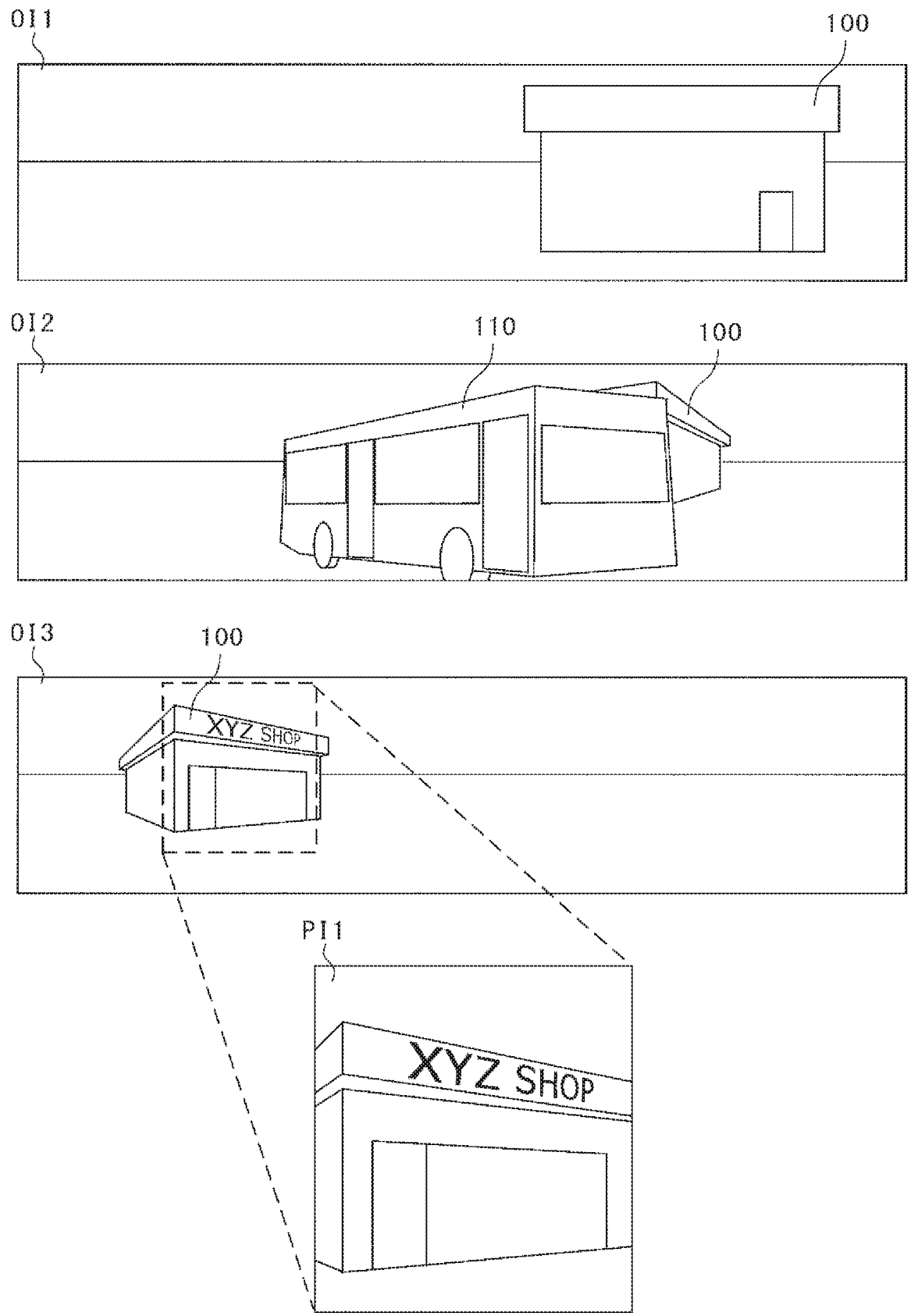
FIG. 6 is a diagram that illustrates examples of an omnidirectional image and a partial image.

FIG. 6 is a diagram that illustrates examples of an omnidirectional image and a partial image. In FIG. 6, omnidirectional images are simply illustrated in a form similar to that of panorama images. Omnidirectional images OI1 to OI3 are images photographed at the viewpoints P1 to P3, respectively. In the omnidirectional image OI1, the back of the shop 100 is shown, but the shop name is not shown. In the omnidirectional image OI2, a part of the shop 100 and an automobile 110 are shown. Since the front face of the shop 100 is hidden by the automobile 110, the shop name is not visible. In the omnidirectional image OI3, the front face of the shop 100 is visible from an oblique angle, and the shop name is displayed at a roof part of the shop 100. In this case, the partial image extraction unit 112 recognizes, by character recognition, the shop name from the omnidirectional image OI3, and therefore extracts a partial image PI1 from the omnidirectional image OI3. The partial image PI1 is an image including the shop name and most of the shop 100. In this way, it is possible to extract, as a partial image, an image of the display object photographed from a viewpoint capable of photographing a front face of the display object, the image having the display object not hidden by obstacles.

There is a case where two or more omnidirectional images include display object information among the omnidirectional images acquired from the omnidirectional image server 2. Alternatively, there is a case where one omnidirectional image includes two or more pieces of display object information. For example, there is a case where two or more omnidirectional images show the shop name, or one omnidirectional image shows two or more shop names. In this case, the partial image extraction unit 112 may determine the omnidirectional image of the extraction source of the partial image or an extraction area of the partial image, based on at least one of a size (the numbers of horizontal and vertical pixels) of the shop name in the omnidirectional image, a degree of distortion of the shop name, a recognition precision of the shop name, a size of the construct (shop) in the omnidirectional image, presence or absence of the obstacle (for example, a person, a vehicle, a fence, or the like) in front of the construct, a degree of sharpness of the image, and the like. For example, the partial image extraction unit 112 extracts the partial image from the omnidirectional image having a relatively large shop name, the omnidirectional image having a small degree of distortion of the shop name, the omnidirectional image having a large recognition precision of the shop name, the omnidirectional image having a large construct, the omnidirectional image having a small number of obstacles, or the sharp omnidirectional image. In the omnidirectional image, as a quadrangle circumscribing the shop name is closer to a rectangle, the distortion of the shop name is smaller. The image having a smaller out-of-focus or a more distinct edge is a sharp image.

In a case where feature values of an image of an item for sale are acquired as the display object information, the partial image extraction unit 112 recognizes, by object recognition, the item for sale from the omnidirectional image by using the feature values. The partial image extraction unit 112 may identify the area of the partial image so that, for example, a whole or most of the construct shown in the omnidirectional image while being overlaid by on the item for sale is included. In a case where the shop name and the feature values are acquired as the display object information, the partial image extraction unit 112 may identify the area of the partial image so that, for example, a whole or most of the construct shown in the omnidirectional image while being overlaid by both of the shop name and the item for sale is included.

Note that, the partial image extraction unit 112 may calculate the direction in which the shop is located from the viewpoint, based on the longitude and latitude of the shop and the longitude and latitude of the viewpoint and identify a portion including the display object information by using pattern recognition from the area corresponding to the calculated direction in the omnidirectional image.

The partial image extraction unit 112 may initially acquire a plurality of low-resolution omnidirectional images from the omnidirectional image server 2 and identify the low resolution including the display object information among the acquired low-resolution omnidirectional images. After that, the partial image extraction unit 112 may acquire an original omnidirectional image corresponding to the low-resolution omnidirectional image including the display object information among a plurality of original omnidirectional images from the omnidirectional image server 2 and extract the partial image from the original omnidirectional image. This reduces the number of the original images to be transmitted from the omnidirectional image server 2 to the information providing server 1, and thus the load on the network and the processing load on the server can be reduced. The original omnidirectional image corresponding to the low resolution image is an original omnidirectional image of a generation source of the low resolution image or an original omnidirectional image having the resolution different from that of the low resolution image but having the same picture as that of the low resolution image.

In a case where a plurality of low-resolution omnidirectional images having resolutions different from each other is generated from the original omnidirectional image and stored in the omnidirectional image DB 24a, the partial image extraction unit 112 may, for example, initially acquire low-resolution omnidirectional images having the lowest resolution from the omnidirectional image server 2 and identify, by using object recognition, a low-resolution omnidirectional image showing a signboard or the like having the probability of displaying the shop name among these low-resolution omnidirectional images. Next, the partial image extraction unit 112 may acquire low-resolution omnidirectional images corresponding to the identified low-resolution omnidirectional image among the low-resolution omnidirectional images having the second lowest resolution from the omnidirectional image server 2 and identify a low-resolution omnidirectional image having the shop name displayed on the signboard portion or the like among these low-resolution omnidirectional images. Then, the partial image extraction unit 112 may acquire the original omnidirectional image corresponding to the identified low-resolution omnidirectional image.

The partial image output unit 113 outputs the partial image extracted by the partial image extraction unit 112. For example, in a case where a user designated any shop from the search result page, the partial image output unit 113 transmits the partial image to the user terminal 3 and causes the partial image to be displayed in the search result page. Alternatively, in a case where a user selected any item for sale from the search result page, the partial image output unit 113 transmits a sale item page including the partial image to the user terminal 3.

Figure 7:
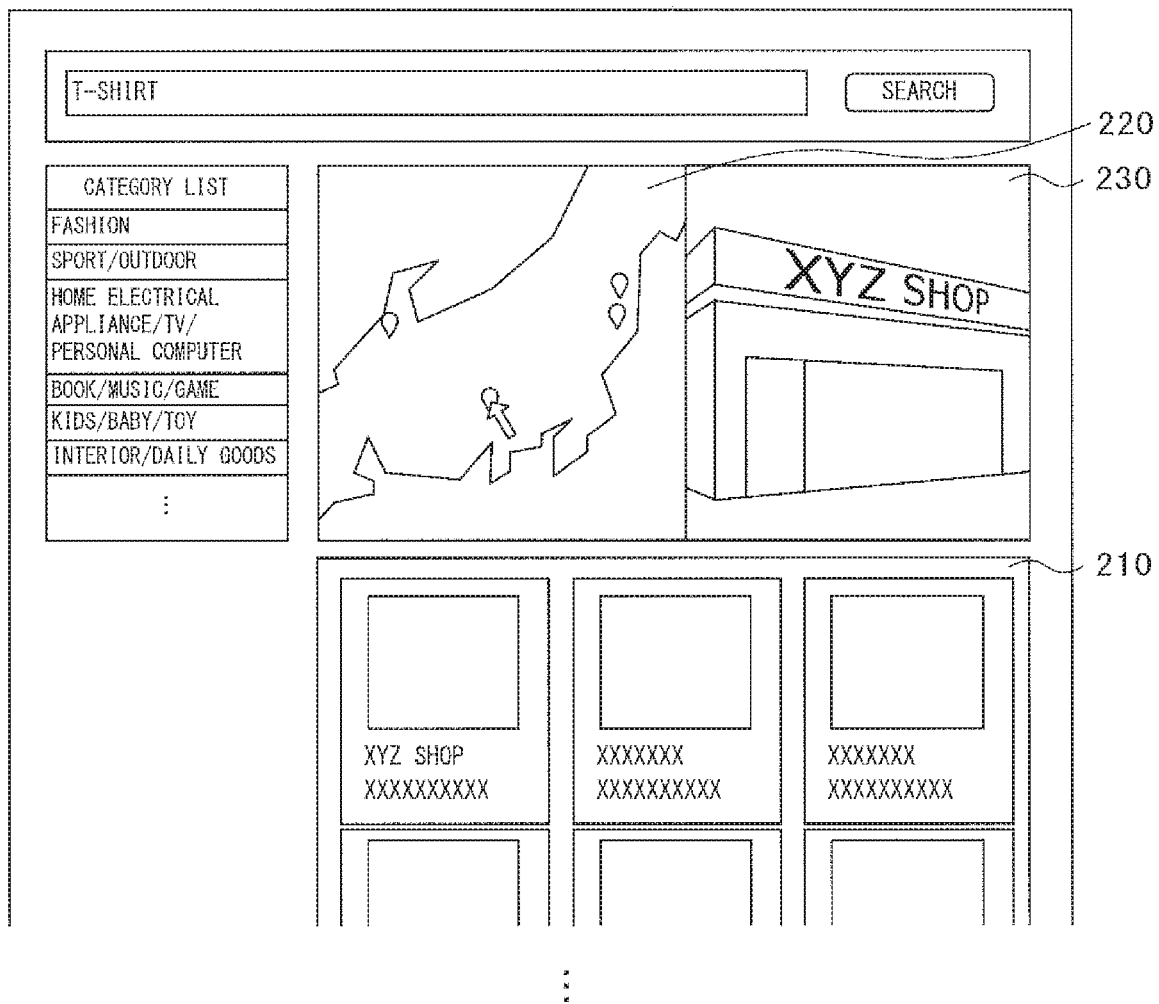
FIG. 7 is one example of a search result page.

FIG. 7 is one example of the search result page. As shown in FIG. 7, the search result page includes a sale item list 210, a map area 220, a shop image area 230, and the like. In the sale item list 210, information about the found item for sale is displayed in a list. In the map area 220, for example, a map of whole or part of Japan is displayed and also a mark indicating a location of a shop of a selling source of the found item for sale is displayed. In the shop image area 230, an image of the shop extracted as the partial image is displayed. When a user selected any mark from the map area 220, an image of the shop corresponding to the mark is displayed in the shop image area 230.

[1-5. Operation of Information Providing System]

Figure 8:
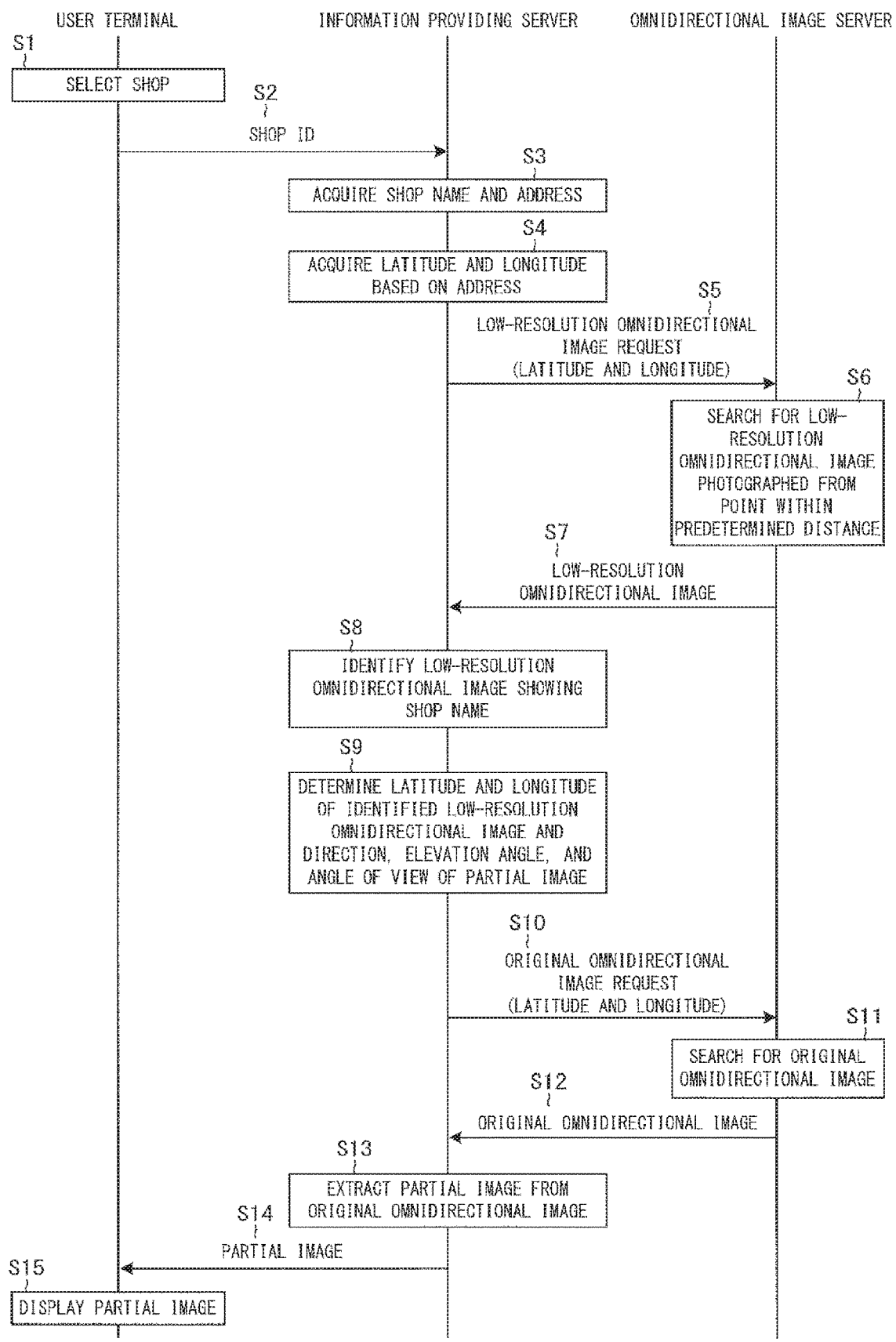
FIG. 8 is a sequence chart that illustrates an operation example of the information providing system S according to one embodiment.

Next, an operation of the information providing system S will be described with reference to FIG. 8. FIG. 8 is a sequence chart that illustrates an operation example of the information providing system S according to the present embodiment. When a web page of the online shopping mall is displayed on the user terminal 3, a user inputs a search condition and the user terminal 3 transmits the search condition to the information providing server 1. The information providing server 1 searches for sale item information of an item for sale that satisfies the search condition from the sale item DB 14b. The information providing server 1, for example, generates the search result page shown in FIG. 7 and transmits it to the user terminal 3.

As shown in FIG. 8, a user selects a mark of any shop from the map area 220 of the search result page (step S1). Then, the user terminal 3 transmits a shop ID of the selected shop to the information providing server 1 (step S2). The display object information acquisition unit 111 acquires a shop name and an address stored in the shop DB 14a in association with the received shop ID (step S3). Then, the display object information acquisition unit 111 acquires a longitude and latitude corresponding to the acquired address (step S4).

Then, the display object information acquisition unit 111 transmits a low-resolution omnidirectional image request including the acquired longitude and latitude to the omnidirectional image server 2 (step S5). The omnidirectional image server 2 identifies, from the omnidirectional image DB 24a, longitudes and latitudes of one or more viewpoints located within a predetermined distance of a position indicated by the longitude and latitude included in the low-resolution omnidirectional image request. Then, the omnidirectional image server 2 searches for a low-resolution omnidirectional images associated with the found longitudes and latitudes from the omnidirectional image DB 24a (step S6). Then, the omnidirectional image server 2 transmits the found low-resolution omnidirectional images to the information providing server 1 in association with the longitudes and latitudes (step S7).

The partial image extraction unit 112 identifies, by character recognition, a low-resolution omnidirectional image showing the shop name among the low-resolution omnidirectional images received from the information providing server 1 (step S8). Then, the partial image extraction unit 112 determines an extraction area (a direction, an elevation angle, and horizontal and vertical angles of view) of the partial image in the identified low-resolution omnidirectional image so that at least the partial image includes the shop name (step S9). Then, the partial image extraction unit 112 transmits the original omnidirectional image request including the longitude and latitude associated with the identified low-resolution omnidirectional image to the information providing server 1 (step S10). The information providing server 1 searches for an original omnidirectional image associated with the longitude and latitude included in the original omnidirectional image request from the omnidirectional image DB 24a (step S11). The information providing server 1 transmits the found original omnidirectional image to the information providing server 1 (step S12). The partial image extraction unit 112 extracts the partial image from the original omnidirectional image, based on the determined extraction area (step S13).

The partial image output unit 113 transmits the extracted partial image to the user terminal 3 (step S14). The user terminal 3 displays the partial image received from the information providing server 1 in the shop image area 230 of the search result page (step S15).

As described above, according to the present embodiment, the system control unit 11 acquires the position information indicating the position of the shop as a display object and the display object information indicating the display object. In addition, the system control unit 11 extracts a partial image including the acquired display object information from omnidirectional images photographed from one or more viewpoints located within a predetermined distance of a position indicated by the acquired position information. Further, the system control unit 11 outputs the extracted partial image. Hence, it is possible to increase the probability that an image showing the front face of the display object is displayed initially as the partial image.

In addition, the system control unit 11 may acquire the display object information indicating an appearance of at least part of the front face of the display object. Further, the system control unit 11 may extract a partial image including an image having an appearance indicated by the display object information. In this case, the probability that an image showing the front face of the display object is displayed initially can be increased.

In addition, the system control unit 11 may acquire the display object information indicating a shop name of the display object. Further, the system control unit 11 may extract the partial image including the shop name of the display object in the image. In this case, the system control unit 11 extracts a partial image including the shop name of the display object that is probability being displayed at the front face of the display object. Hence, the probability that an image showing the front face of the display object is displayed initially can be increased.

In addition, the system control unit 11 may acquire a plurality of low-resolution omnidirectional images from the omnidirectional image server 2 that stores a plurality of low-resolution omnidirectional images having relatively low resolutions as the omnidirectional images photographed from one or more viewpoints, and a plurality of original omnidirectional images having relatively high resolutions and corresponding to the plurality of low-resolution omnidirectional images, respectively. Further, the system control unit 11 may identify a low-resolution omnidirectional image including the display object information among the acquired plurality of low-resolution omnidirectional images. In addition, the system control unit 11 may acquire, from the omnidirectional image server 2, an original omnidirectional image corresponding to the identified low-resolution omnidirectional image among the plurality of original omnidirectional images. Further, the system control unit 11 may extract a partial image including the display object information from the acquired original omnidirectional image. In this case, it is possible to reduce the processing load on the information providing server 1 and the communication load between the information providing server 1 and the omnidirectional image server 2 more than in the case of acquiring all the original omnidirectional images.

In addition, the system control unit 11 may extract the partial image from the photographed omnidirectional image by using pattern recognition. In this case, the system control unit 11 analyzes an omnidirectional image by using pattern recognition to thereby identify and extract the partial image including the display object information from the omnidirectional image.

2. Second Embodiment

Next, an embodiment in a case where an information providing server 1 searches for a geographical object will be described. In the present embodiment, the information providing server 1 receives, from a user terminal 3, a keyword that was input by a user as a search condition, and searches for the geographical object, based on the keyword. The information providing server 1 transmits, as the search result page, a web page showing a search result including an image of the front face of the found geographical object to the user terminals 3.

[2-1. Configuration of Information Providing Server]

Figure 9:
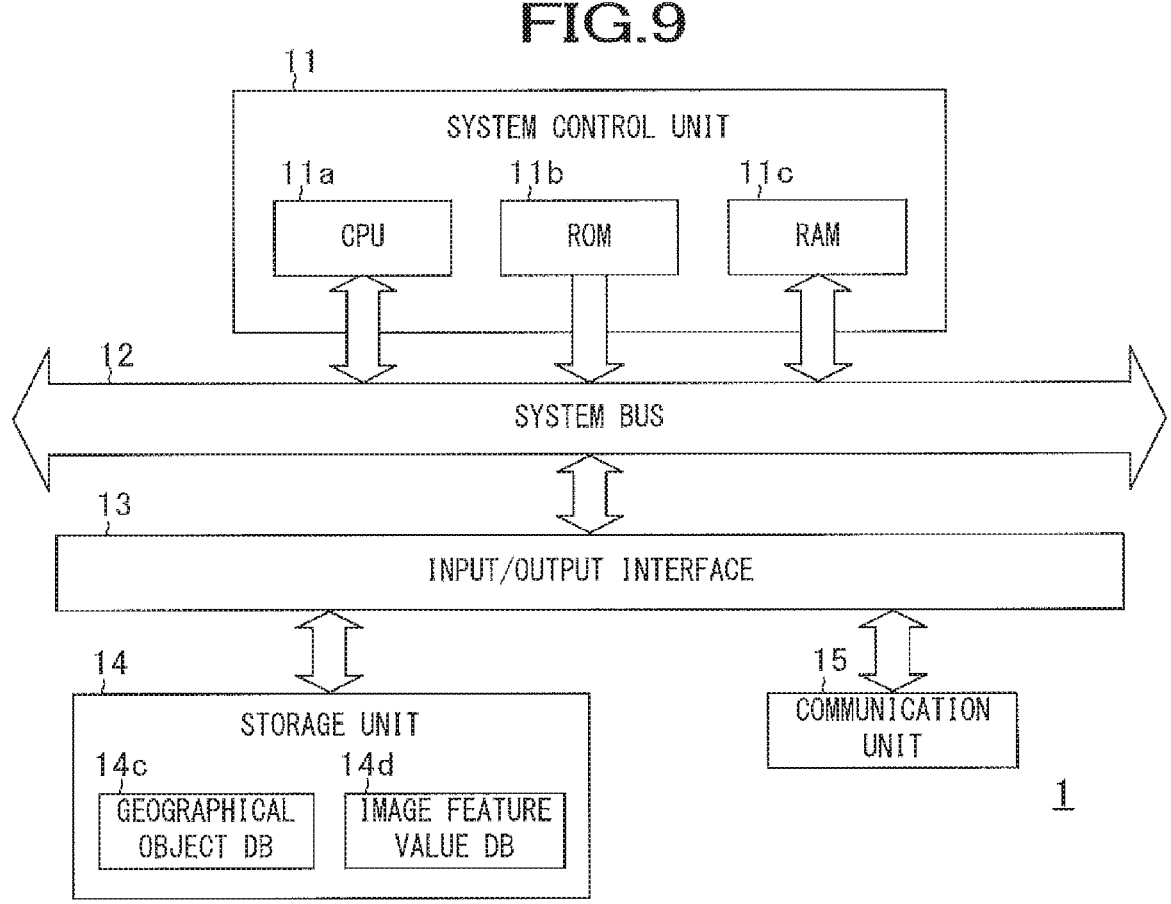
FIG. 9 is a block diagram that illustrates one example of a schematic configuration of the information providing server 1 according to one embodiment.

First, a configuration of the information providing server 1 will be described with reference to FIGS. 9 and 10. FIG.

9 is a block diagram that illustrates one example of a schematic configuration of the information providing server 1 according to the present embodiment. In FIG. 9, elements similar to those in FIG. 2A is attached with the same signs. The information providing server 1 of the present embodiment is different from the information providing server 1 of the first embodiment in a point that the storage unit 14 of the information providing server 1 of the present embodiment does not store the shop DB 14a and the sale item DB 14b and stores the geographical object DB 14c and the image feature value DB 14d.

FIG. 10 is a diagram that illustrates one example of contents stored in databases. The geographical object DB 14c stores the geographical object information about the geographical object. Specifically, the geographical object DB 14c stores a geographical object ID, a geographical object name, position information of the geographical object, explanation of the geographical object, category information, and the like for each geographical object in association with each other. The geographical object ID is identification information for identifying the geographical object. The geographical object name is a proper name indicating the geographical object. The position information is an address or a longitude and latitude. The category information indicates a category to which the geographical object indicated by the geographical object name belongs among a plurality of categories of geographical objects.

The image feature value DB 14d stores feature values of an image related to the keyword. Specifically, the image feature value DB 14d stores a keyword and feature values in association with each other for each keyword. As the keyword, for example, a generic name of the geographical object may be stored. The keyword as the generic name of the geographical object represents a kind of the geographical object. As the feature values, a feature of an exemplary image of the geographical object represented by the keyword are indicated. The feature values preferably indicate a feature of a shape, pattern, and color which are probably positioned or displayed at the front face of the geographical object. For example, for a keyword "shrine", the feature values of a torii gate are stored. In addition, as the keyword, for example, a name of a chain, such as a plurality of shops or hotels, a name of a corporate body having a plurality of business facilities and the like, or the like may be stored. The feature values may, for example, indicate a feature of trademarks of a chain and a corporate body and other marks. The keyword as the corporate body name represents a category of the geographical object.

[2-2. Function Summary of System Control Unit of Information Providing Server]

The display object information acquisition unit 111 acquires position information of the geographical object found based on the keyword input by the user from the geographical object DB 14c. For example, in a case where the name of the display object was input as the keyword, the display object information acquisition unit 111 searches for geographical object information including the geographical object name that is identical with the input name from the geographical object DB 14c. Alternatively, the display object information acquisition unit 111 searches for geographical object information that includes one or more input keywords in at least one of the geographical object name, position information, and explanation of the geographical object. The display object information acquisition unit 111 acquires the position information from the found geographical object information.

The display object information acquisition unit 111, in a case where a keyword input by the user is identical with any geographical object name stored in the geographical object DB 14c, may acquire the keyword as the display object information. Alternatively, the display object information acquisition unit 111 may acquire the geographical object name included in the found geographical object information as the display object information from the geographical object DB 14c. Alternatively, the display object information acquisition unit 111 may acquire the feature values associated with a keyword that is identical with at least any one keyword of the keywords input by the user or that is included in this keyword, as the display object information from the image feature value DB 14d. Alternatively, the image feature value DB 14d may store, in association with each category of a plurality of geographical objects, feature values of an exemplary image of the geographical object of the category. The display object information acquisition unit 111 may acquire, with reference to category information of the display object, the feature values associated with a category corresponding to the display object from the image feature value DB 14d.

The display object information acquisition unit 111 may acquire the feature values together with the geographical object name (the keyword representing the geographical object or geographical object name included in the geographical object information). Alternatively, the display object information acquisition unit 111, in a case where one piece of geographical object information is found, may acquire only the geographical object name, and in a case where a plurality of pieces of geographical object information is found, may acquire only the feature values. For example, when a user inputs a name "Hot spring A" of the display object as the keyword, it is assumed that one piece of geographical object information is found for a hot-spring hotel with the name "Hot spring A". In this case, the keyword "Hot spring A" is display object information. In addition, when a user inputs, as the keyword, "B city Shrine" that is a combination of a name of a region where the display object is located and a general name indicating a kind of the display object, it is assumed that the geographical object information of a plurality of shrines located in B city is found. In this case, the display object information acquisition unit 111 acquires the feature values of the torii gate associated with "shrine" as the display object information from the image feature value DB 14d. Note that, the display object information acquisition unit 111 may acquire at least any one of the geographical object name and the feature values as the display object information regardless of the number of pieces of the found geographical object information.

The partial image extraction unit 112 may extract a partial image including the geographical object name from the omnidirectional image. Alternatively, the partial image extraction unit 112 may extract a partial image including the feature indicated by the feature values acquired from the image feature value DB 14d. For example, the partial image output unit 113 extracts feature points from the omnidirectional image by using SIFT, SURF, or the like, and calculates local feature values of one or more places in the omnidirectional image, based on the feature points. The partial image output unit 113 compares the local feature values with a feature values acquired from the image feature value DB 14d and calculates a similarity degree. The partial image output unit 113, in a case where there are local feature values calculated to have a similarity degree of a predetermined value or more, extracts a partial image including an area at which the local feature values were calculated in the omnidirectional image. Alternatively, the partial image extraction unit 112 may extract a partial image including both the geographical object name and an image having a feature indicated by the feature values. Alternatively, the partial image extraction unit 112 may extract a partial image including at least any one of the geographical object name and an image having a feature indicated by the feature values. Alternatively, the partial image extraction unit 112, in a case where one piece of geographical object information is found, may extract a partial image including the geographical object name, and in a case where a plurality of pieces of geographical object information is found, may extract a partial image including a feature indicated by the feature values.

FIG. 11 is a diagram that illustrates examples of an omnidirectional image and a partial image. When a user inputs a keyword "B city Shrine", for example, a plurality of shrines located in the B city is searched for. In FIG. 11, omnidirectional images OI4 and OI5 are images photographed from a viewpoint located within a predetermined distance of one shrine of these shrines. It is assumed that feature values of a torii gate are used as the display object information. The omnidirectional image OI4 shows a rear face of a main shrine 310 of the shrine but does not show the torii gate. The omnidirectional image OI4 shows a front face of the main shrine 310 and a torii gate 320. Hence, the partial image extraction unit 112 extracts a partial image PI2 including most of the torii gate 320 from the omnidirectional image OI4. The partial image PI2 also includes the front face of the main shrine 310 but may not include the main shrine 310 because the torii gate 320 existing at the front face of the shrine may be included in a partial image.

There is a case where for one geographical object, display object information is included in two or more omnidirectional images. In this case, similarly to the case of the first embodiment, the partial image extraction unit 112 may determine an omnidirectional image of the extraction source of the partial image, based on at least one of a size of the geographical object name in the omnidirectional image, a degree of distortion of the geographical object name, a recognition precision of the geographical object name, a size of the geographical object (a whole or part of the geographical object) the feature of which are indicated by the feature values, a recognition precision of the geographical object, presence or absence of the obstacle in front of the geographical object, a degree of sharpness of the image, and the like. In addition, the partial image extraction unit 112 may determine, based on category information of the display object information, in which time zone an omnidirectional image, from which the partial image is preferentially extracted, was photographed. For example, the partial image extraction unit 112 may preferentially use the omnidirectional image photographed during the day for a shop, a public office, or the like which is open during the day, and preferentially use the omnidirectional image photographed during the night for a shop which is open during the night.

Figure 12:
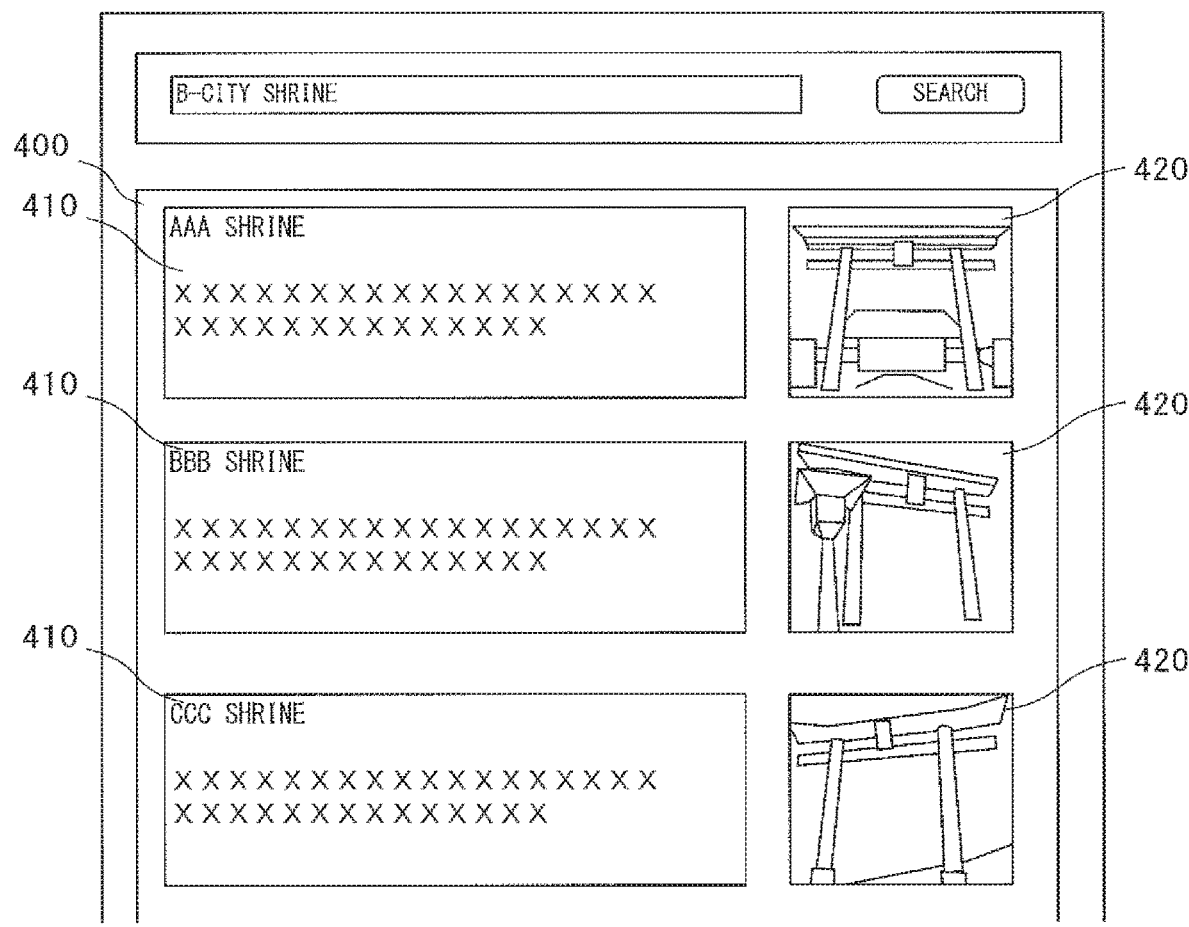
FIG. 12 is a diagram that illustrates one example of a search result page.

The partial image output unit 113 transmits a search result page including the extracted partial image to the user terminal 3. FIG. 12 is a diagram that illustrates one example of the search result page. As shown in FIG. 12, the search result page includes a geographical object list 400 and the like. In the geographical object list 400, as the information of the found geographical object, geographical object simple information 410, geographical object images 420, and the like are displayed. The geographical object simple information 410 is, for example, a name, position information, explanation, and the like of the geographical object. The geographical object images 420 are images of the front face of the geographical object extracted as the partial image. The partial image output unit 113 may, for example, based on the resolution of the partial image, determine the display ranks of pieces of information of the geographical objects in the geographical object list 400. For example, the piece of information of the geographical object with the partial image having a higher resolution has a higher display rank. The partial image output unit 113 may, based on the position information of the found geographical object, divide the pieces of information of the geographical objects into groups by clustering and cause the groups to be displayed. For example, pieces of information of the geographical objects the distance between which is small are grouped.

[2-3. Operation of Information Providing System]

Figure 13:
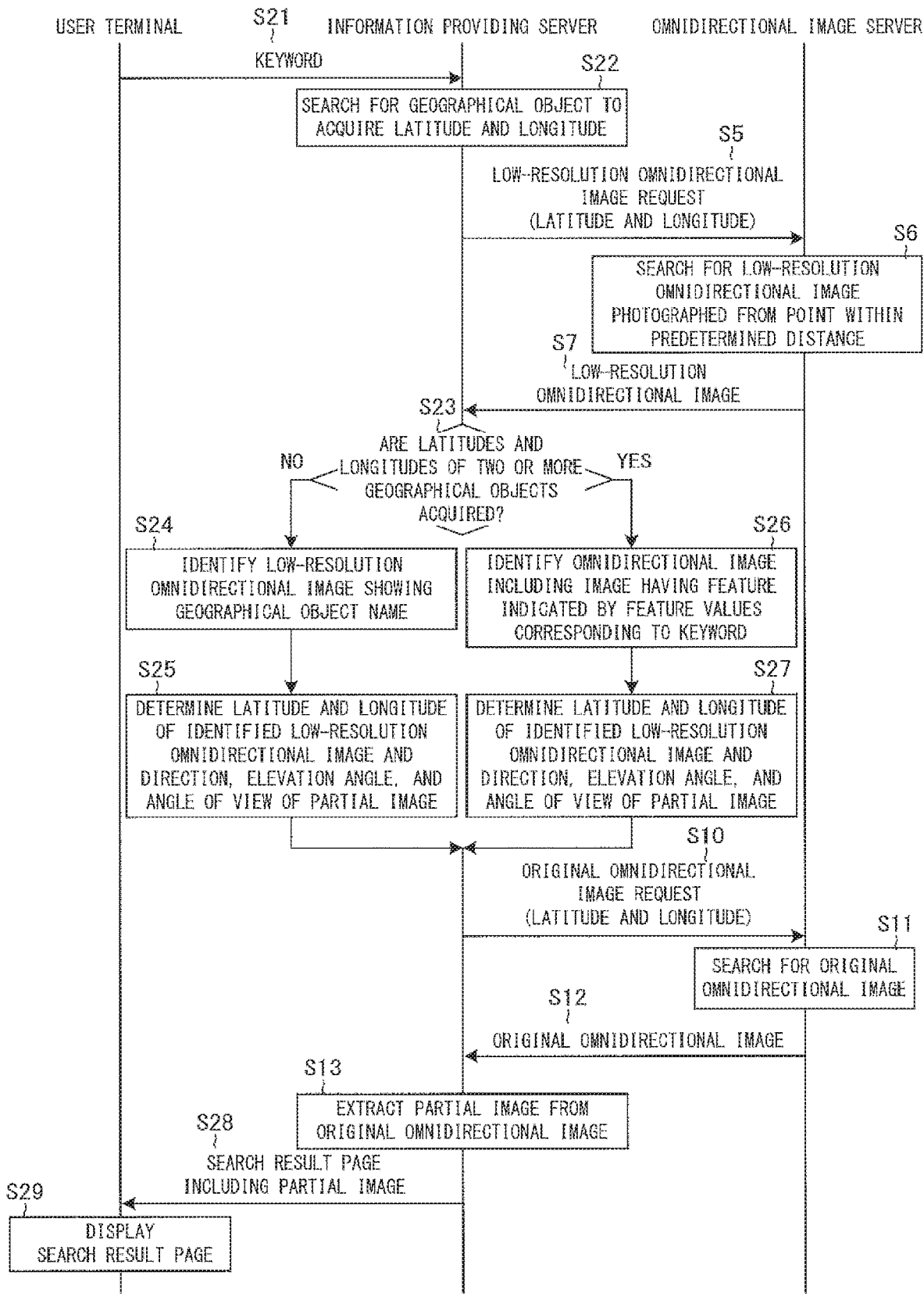
FIG. 13 is a sequence chart that illustrates an operation example of the information providing system S according to one embodiment.

Next, an operation of the information providing system S will be described with reference to FIG. 13. FIG. 13 is a sequence chart that illustrates an operation example of the information providing system S according to the present embodiment. In FIG. 13, the same steps as those in FIG. 8 are attached with the same signs.

As shown in FIG. 13, when a user inputs a keyword, a user terminal 3 transmits the keyword to the information providing server 1 (step S21). The display object information acquisition unit 111 searches for one or more pieces of geographical object information from the geographical object DB 14*c* by using the keyword received from the user terminal 3. Then, the display object information acquisition unit 111 acquires the position information from each geographical object information. In a case where the position information is an address, the display object information acquisition unit 111 acquires a longitude and latitude corresponding to the address (step S22). Then, steps S5 to S7 are executed for each acquired longitude and latitude. That is, the display object information acquisition unit 111 acquires, from the omnidirectional image server 2, for each of the found geographical objects, one or more low-resolution omnidirectional images photographed from one or more viewpoints located within a predetermined distance of a position of the geographical object.

Then, the partial image output unit 113 determines whether or not longitudes and latitudes of two or more geographical objects were acquired in step S22 (step S23). The partial image output unit 113, when having determined that the longitudes and latitudes of two or more geographical objects were not acquired (NO in step S23), advances the processing to step S24. On the other hand, the partial image output unit 113, when having determined that the longitudes and latitudes of two or more geographical objects were acquired (YES in step S23), advances the processing to step S26.

In step S24, the display object information acquisition unit 111 acquires a keyword representing a geographical object name among the input keywords, or acquires a geographical object name from the found geographical object information. The partial image output unit 113 identifies, by character recognition, a low-resolution omnidirectional image showing the geographical object name among the low-resolution omnidirectional images received from the information providing server 1. Then, the partial image output unit 113 determines an extraction area of the partial image so in the identified low-resolution omnidirectional image that at least the partial image includes the geographical object name (step S25).

In step S26, the display object information acquisition unit 111 identifies a keyword that is identical with the keyword stored in the image feature value DB 14d among the input keywords. The display object information acquisition unit 111 acquires feature values associated with the identified keyword from the image feature value DB 14d. The partial image output unit 113 identifies, for each of the acquired longitudes and latitudes, a low-resolution omnidirectional image including a feature indicated by the feature values acquired from the image feature value DB 14d among the low-resolution omnidirectional images received from the information providing server 1. Then, the partial image output unit 113 determines, for each of the acquired longitudes and latitudes, an extraction area of the partial image so that at least the partial image includes a feature indicated by the feature values in the identified low-resolution omnidirectional image (step S27).

After the step S25 or step S27 is finished, for each of the acquired longitudes and latitudes, steps S10 to S12 are executed. That is, the partial image extraction unit 112 acquires, for each of the found geographical objects, from the omnidirectional image server 2, an original omnidirectional image corresponding to the low-resolution omnidirectional image identified in step S24 or step S26. Then, the partial image extraction unit 112 extracts, for each of the acquired longitudes and latitudes, a partial image from the original omnidirectional image, based on the determined extraction area (step S13).

The partial image output unit 113 generates and transmits a search result page including the extracted partial images to the user terminal 3 (step S28). The user terminal 3 displays the search result page received from the information providing server 1 (step S29).

As described above, according to the present embodiment, the system control unit 11 acquires the display object information indicating the name of the display object. Further, the system control unit 11 extracts the partial image including the name of the display object. Hence, the probability that an image showing the front face of the display object is displayed initially can be further increased.

In addition, the system control unit 11 may acquire position information associated with the geographical object name included in the display object information from the geographical object DB 14c that stores a name of a geographical object and position information indicating a position of the geographical object in association with each other for each of a plurality of geographical objects. In this case, the information providing server 1 can extract a partial image and acquire position information of a display object by using a name of the display object.

In addition, the system control unit 11 may acquire, as display object information, feature values of a of a kind or category of geographical object corresponding to the display object from the image feature value DB 14d that stores feature values indicating a feature of an image of each of a plurality of kinds or categories of geographical objects. Further, the system control unit 11 may extract a partial image including a feature indicated by the acquired feature values. In this case, the system control unit 11 extracts a partial image including a feature indicated by feature information of a kind or category of a geographical object corresponding to the display object. Hence, the probability that an image showing the front face of the display object is displayed initially can be increased.

REFERENCE SIGNS LIST 1 information providing server
2 omnidirectional image server
3 user terminal
11 system control unit
12 system bus
13 input/output interface
14 storage unit
14a shop DB
14b sale item DB
14c geographical object DB
14d image feature value DB
15 communication unit
111 display object information acquisition unit
112 partial image extraction unit
113 partial image output unit
21 system control unit
22 system bus
23 input/output interface
24 storage unit
24a omnidirectional image DB
NW network

The invention claimed is:

1. An image extraction device, comprising:
at least one memory configured to store computer program code;
at least one processor configured to access said computer program code and operate as instructed by said computer program code, said computer program code including:
display object information acquisition code configured to cause at least one of the at least one processor to acquire position information indicating a position of a display object and display object information indicating a feature of an appearance of at least part of the display object;
image acquisition code configured to cause at least one of the at least one processor to acquire a plurality of images photographed from a plurality of spots located within a predetermined distance of a position indicated by the acquired position information;
detection code configured to cause at least one of the at least one processor to detect image feature information indicating a feature of an appearance of each of a plurality of parts of each of the acquired plurality of images;
determination code configured to cause at least one of the at least one processor to determine a similarity degree between the acquired display object information and the detected image feature information on the each of the acquired plurality of images;
identification code configured to cause at least one of the at least one processor to identify at least one image, among the acquired plurality of images, for which the determined similarity degree is higher than a predetermined value;
extraction code configured to cause at least one of the at least one processor to extract a partial image from each of the at least one identified image based on position information indicating a position of a specific part among the plurality of parts of the at least one identified image, wherein the similarity degree between the acquired display object information and the image feature information detected from the specific part is higher than the predetermined value, and the partial image corresponds to the specific part; and
output code configured to cause at least one of the at least one processor to output the extracted partial image.

2. The image extraction device according to claim 1, wherein the acquired display object information indicates a feature of an appearance of at least part of a front face of the display object.

3. The image extraction device according to claim 1, wherein
the acquired display object information includes a group of characters representing a name of the display object, and
the detection code is configured to cause at least one of the at least one processor to detect, as the image feature information, a group of characters in each of the acquired plurality of images.

4. The image extraction device according to claim 3, wherein
the display object information acquisition code is configured to cause at least one of the at least one processor to acquire position information associated with the name indicated by the acquired display object information from a position information storage that stores, for each of a plurality of geographical objects, a name of a geographical objects and position information indicating a position of the geographical object in association with each other.

5. The image extraction device according to claim 1, wherein
the acquired display object information includes feature vectors indicating a feature of at least part of an image of the display object, and
the detection code is configured to cause at least one of the at least one processor to detect, as the image feature information, feature vectors of at least part of each of the acquired plurality of images.

6. The image extraction device according to claim 5, wherein
the display object information acquisition code is configured to cause at least one of the at least one processor to acquire, as the display object information, feature vectors of at least part of an image of a geographical object in a category, among a plurality of categories, including the display object from a feature information storage that stores feature vectors of at least part of an image of each of geographical objects in the plurality of categories.

7. The image extraction device according to claim 1, wherein
the detection code is configured to cause at least one of the at least one processor to detect the image feature information by using pattern recognition.

8. The image extraction device according to claim 1, wherein
the display object information acquisition code is configured to cause at least one of the at least one processor to acquire the position information and the display object information on, as the display object, a shop selling an item selected by a user among from items presented to the user.

9. An image extraction device, comprising:
at least one memory configured to store computer program code;
at least one processor configured to access said computer program code and operate as instructed by said computer program code, said computer program code including:
display object information acquisition code configured to cause at least one of the at least one processor to acquire position information indicating a position of a display object and display object information indicating a feature of an appearance of at least part of the display object;
image acquisition code configured to cause at least one of the at least one processor to acquire a plurality of images photographed from a plurality of spots located within a predetermined distance of a position indicated by the acquired position information;
detection code configured to cause at least one of the at least one processor to detect image feature information indicating a feature of an appearance of at least part of each of the acquired plurality of images;
determination code configured to cause at least one of the at least one processor to determine a similarity degree between the acquired display object information and the detected image feature information on the each of the acquired plurality of images;
identification code configured to cause at least one of the at least one processor to identify at least one image, among the acquired plurality of images, for which the determined similarity degree is higher than a predetermined value; and
output code configured to cause at least one of the at least one processor to output at least one image including at least part, of the at least one identified image, from which the image feature information has been detected, wherein
the image acquisition code is further configured to cause at least one of the at least one processor to acquire a plurality of low resolution images from an image storage that stores, as the plurality of images photographed from the plurality of spots, the plurality of low resolution images and a plurality of high resolution images corresponding to the plurality of respective low resolution images,
each of the plurality of high resolution images has a resolution higher than a resolution of a corresponding low resolution image among the plurality of low resolution images,
a scene in each of the plurality of high resolution images is the same as a scene in a corresponding low resolution image among the plurality of low resolution images,
the detection code is further configured to cause at least one of the at least one processor to detect the image feature information indicating the feature of the appearance of at least part of each of the acquired plurality of low resolution images,
the identification code is further configured to cause at least one of the at least one processor to identify at least one low resolution image, among the acquired plurality of low resolution images, for which the determined similarity degree is higher than the predetermined value, and acquire, from the image storage, at least one high resolution image, among the plurality of high resolution images, corresponding to the at least one identified low resolution image; and
the output code is further configured to cause at least one of the at least one processor to output the at least one image including at least part, of the at least one acquired high resolution image, from which the image feature information has been detected.

10. An image extraction method performed by a computer, the method comprising:
acquiring position information indicating a position of a display object and display object information indicating a feature of an appearance of at least part of the display object;

acquiring a plurality of images photographed from a plurality of spots located within a predetermined distance of a position indicated by the acquired position information;

detecting image feature information indicating a feature of an appearance of each of a plurality of parts of each of the acquired plurality of images;

determining a similarity degree between the acquired display object information and the detected image feature information on the each of the acquired plurality of images;

identifying at least one image, among the acquired plurality of images, for which the determined similarity degree is higher than a predetermined value;

extracting a partial image from each of the at least one identified image based on position information indicating a position of a specific part among the plurality of parts of the at least one identified image, wherein the similarity degree between the acquired display object information and the image feature information detected from the specific part is higher than the predetermined value, and the partial image corresponds to the specific part; and outputting the extracted partial image.

11. A non-transitory computer readable medium storing thereon a computer program, the program causing a computer to:

acquire position information indicating a position of a display object and display object information indicating a feature of an appearance of at least part of the display object;

acquire a plurality of images photographed from a plurality of spots located within a predetermined distance of a position indicated by the acquired position information;

detect image feature information indicating a feature of an appearance of each of a plurality of parts of each of the acquired plurality of images;

determine a similarity degree between the acquired display object information and the detected image feature information on the each of the acquired plurality of images;

identify at least one image, among the acquired plurality of images, for which the determined similarity degree is higher than a predetermined value;

extract a partial image from each of the at least one identified image based on position information indicating a position of a specific part among the plurality of parts of the at least one identified image, wherein the similarity degree between the acquired display object information and the image feature information detected from the specific part is higher than the predetermined value, and the partial image corresponds to the specific part; and output the extracted partial image.

\* \* \* \* \*